United States Patent [19]

Frankland

[11] 4,266,224

[45] May 5, 1981

[54] HIGH PERFORMANCE INFORMATION DISPLAY PANEL

[75] Inventor: Roger A. Frankland, Scottsdale, Ariz.

[73] Assignee: Beckman Instruments, Inc., Fullerton, Calif.

[21] Appl. No.: 15,671

[22] Filed: Feb. 26, 1979

[51] Int. Cl.[3] .................................... G06F 3/14

[52] U.S. Cl. .................................... 340/773; 340/759; 340/779

[58] Field of Search ................ 340/758, 759, 771-774, 340/768-769, 779

[56] References Cited

U.S. PATENT DOCUMENTS

| | | | |
|---|---|---|---|
| 3,614,771 | 10/1971 | Band . | |
| 3,699,377 | 10/1972 | Hall et al. | 340/759 |
| 3,719,940 | 3/1973 | Lay et al. | 340/771 |
| 3,784,862 | 1/1974 | Yoshitoshi et al. . | |
| 3,815,120 | 6/1974 | Kanda . | |
| 3,839,714 | 10/1974 | Janning . | |
| 3,849,686 | 11/1974 | Miyazaki | 340/759 |
| 3,993,979 | 11/1976 | Mehlich . | |
| 3,999,179 | 12/1976 | Prame . | |
| 4,044,349 | 8/1977 | Andoh . | |
| 4,125,830 | 11/1978 | Cochran et al. | 340/762 |

*Primary Examiner*—Marshall M. Curtis
*Attorney, Agent, or Firm*—R. J. Steinmeyer; F. L. Mehlhoff; William H. May

[57] ABSTRACT

A multicharacter dot matrix gas discharge display panel utilizing a plurality of connector lines which provide direct connection to the same corresponding matrix bit within each dot matrix group in the display. The gas display panel allows direct addressing of each bit to achieve high luminescence and viewability. The display has very high resolution. The display also incorporates means for positioning each dot matrix group in such a manner to closely border adjacent dot matrix group, so that the overall display dimension is decreased for a multicharacter dot matrix display panel.

6 Claims, 8 Drawing Figures

HIGH PERFORMANCE INFORMATION DISPLAY PANEL

BACKGROUND OF THE INVENTION

The present invention is directed to gas discharge display panels and, more particularly, is directed to a dot matrix gas discharge display.

For several years much work has been accomplished in the development of gas discharge display panels providing a dot matrix arrangement to allow for the display of messages. The two most prominent types of gas discharge display panels are the row/column arrangements and the glow transfer arrangements.

In a row/column arrangement columns of anode electrodes and rows of cathode electrodes oriented at right angles to each other to form crossover points which provide the location of the addressable glow discharge dots in the panel. One of the principal disadvantages of the row/column arrangement is the necessity to isolate the adjacent leads to an address glow point so that cross talk is eliminated. Various approaches have been used, but each makes the display more complex in construction. Also, the necessary multitude of electrodes to operate a message readout having a row/column arrangement requires a large number of leads, contributing to a complicated driving arrangement.

The glow transfer type of gas display panel is shown, for example, in U.S. Pat. No. 4,035,689 wherein there is gas communication between the respective cellular points which are designed to provide the visible glow in a dot matrix arrangement. Therefore, a multiplexing arrangement can be utilized to have the glow transfer from cell to cell at a rate higher than can be detected by the human eye and, therefore, the number of driving circuits necessary to provide the voltage to produce the glow is significantly reduced. This is a primary basis of technology utilized by Burroughs Corporation in their Self-Scan® gas discharge display panels. However, these panels do have a limitation with respect to the brightness that they can produce since the current is limited because of the time constraints in the operation of the display due to the glow transfer operation. Also, internal structure is necessary to isolate each glow position and this adversely affects the panel viewing angle.

Consequently, it is desirable to create a dot matrix panel which provides some type of compromise between the undesirably low brightness and visibility of the glow transfer type panels, but with less driving circuitry as required in the row/column type of panels.

SUMMARY OF THE INVENTION

The present invention is directed to a multicharacter dot matrix gas discharge display panel wherein each dot matrix group is comprised of a plurality of screen printed cathode bits which are directly connected to respective connector lines which are screen printed on the substrate of the display. Consequently, each of the character bits is directly addressable in this display to provide a high brightness and viewability. Each of the character bits in the same location in each respective character position is tied to the same connector line, so that multiplexing can be utilized to reduce the number of drivers necessary in operating the display. One anode is used in conjunction with each dot matrix group.

The present invention also incorporates the utilization of dual sets of connector lines to the character bits, so that each alternate dot matrix group is connected to a different set of connector lines. This arrangement allows for the placement of dot matrix groups very close to each other, so that there is no distinction between the spacing of the dot matrix groups and the spacing between the bits within each dot matrix group. Therefore, overall length of the display can be reduced for the multicharacter arrangement. More characters can be placed in a display of a given length. The dual sets of connector lines to each alternate dot matrix group will alleviate the crosstalk or streamer problem which could occur between the character bits in one dot matrix group and the anode of an adjacent dot matrix group.

The present invention provides a multicharacter dot matrix gas discharge display panel having higher luminence and viewability than prior display panels while maintaining a reasonable minimum of electrode leads for connection to driving circuitry. The present display is designed to have a brightness of 100 foot lamberts at 1 milliamp cathode current. The display has a vertical and horizontal viewing angle of nearly 180°, being restricted only by the edge of the display. There is no requirement to have internal structure within the display to isolate and surround each glow position to prevent the glow from wandering. Consequently, the present display panel has excellent viewability. The viewable cathode discharge area is significantly larger than existing devices for the same size display character area. This greater display area exposed greatly enhances the viewability of the display.

The unique characteristics of the present invention provide a display panel having high resolution with contiguous dots and unique high brightness. The display uses very small display dots that are clearly defined and provides an especially good readout for smaller devices such as computer terminals, instrumentation, etc.

DETAILED DESCRIPTION OF THE INVENTION

Figure 1:
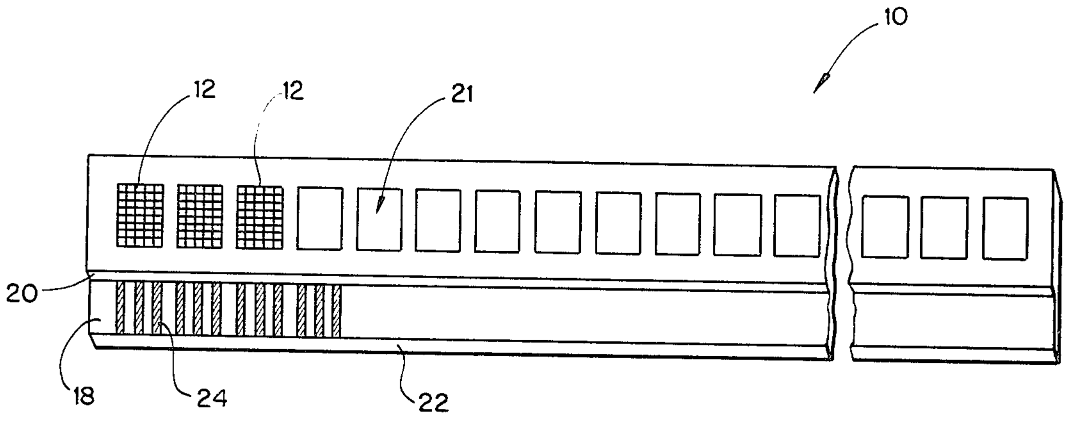
FIG. 1 is a front plan view of a dot matrix gas display device of the present invention.

A dot matrix gas display panel 10 of the present invention is shown in FIG. 1 having a plurality of dot matrix groups 12. The display can be made with any number of dot matrix groups depending upon the size of the message to be displayed. The display is comprised of a substrate 18 and a face plate 20 which area sealed together by a perimeter seal in spaced relation with respect to each other to establish an envelope containing ionizable gas. The dot matrix groups are comprised of cathode electrode bits which are within the envelope and operate in conjunction within an anode electrode 21 located on the interior face of the face plate 20. Extending along one edge 22 of the substrate 18 are terminal pads 24 which are conductively connected to the various cathode electrode bits in the dot matrix groups as well as the anode electrodes by connector lines (not shown). Although the display panel in FIG. 1 shows the terminal pads 24 along one edge 22 of the substrate 18, it is envisioned that the terminal pads could be constructed along other edges of the substrate 18 or faceplate 20.

Figure 2:
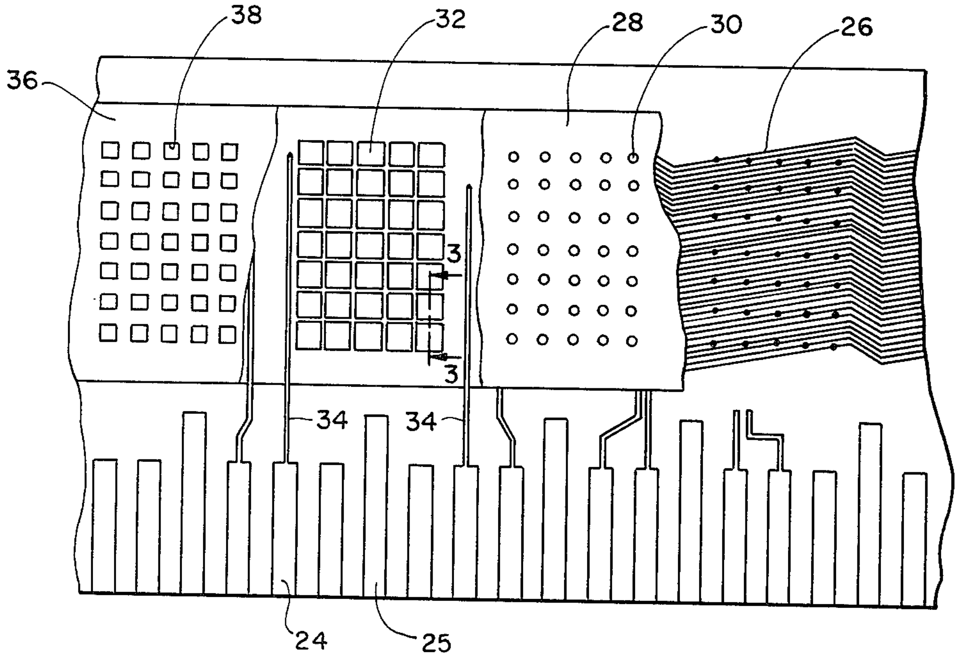
FIG. 2 is an enlarged plan view showing the construction detail of the dot matrix arrangement of a section in the gas display panel.

Reference is made to FIG. 2 to show in more detail the construction of the dot matrix groups 12 on the substrate 18 using various known screen layering techniques with conductive inks and dielectric layers. In the embodiment shown in FIG. 2 the dot matrix has a $5 \times 7$ cathode electrode bit arrangement so that each dot matrix group has 35 bits or dots. A plurality of connector lines 26 are screen printed by a high resolution photoexposed thick film photolithography method on the substrate 18. These conductive lines 26 are extremely narrow and have, for example, a thickness of approximately 0.005 inches with the space between each run also 0.005 inches. A dielectric layer 28 is then screen printed over the connector lines 26. The dielectric layer 28 has a plurality of 35 dot arrangements in the form of vias 30 which are designed to interconnect the connector lines with the cathode bits through the dielectric layer. Therefore, each of the vias 30 in the dielectric layer 28 align with a respective connector line 26, so that each of the vias is aligned with a different connector line 26. The angled stepped arrangement of the conductor lines 26 is one way to allow for the alignment of the vias with different conductor lines 26.

After the insulating layer 28 has been positioned over the connector lines 26, the cathode bits 32 as well as crossover lines 34 are screen printed on the dielectric 28. Each of the cathode bits 32 is designed for alignment with the vias 30 in the dielectric layer 28, so that each separate bits 32 in each dot matrix group is in alignment and interconnected to separate individual connector line 26. Therefore, the activation of any one of the connector lines 26 would energize one bit in each dot matrix group. It should be noted that the same respective bit in each dot matrix group is connected to the same connector line 26.

Because of the close spacing of the connector lines 26 and the large number of connector lines, it is necessary to utilize a series of crossover leads 34 to connect each of the separate individual connector lines 26 to respective connector termination pads 24. The use of the crossover leads is especially desirable to minimize the overall length and size of the display panel. Some of the longer pads 25 are designed for connection by spring clips to the anodes which are on the inside surface of the face plate 20 in FIG. 1 when it is positioned over the substrate 18. Therefore, the utilization of the crossover leads 34 allows for the insulated connection of the termination pad 24 with each of the separate connector lines 26.

After the placement of the cathode bits 32 and the crossover leads 34, a dielectric mask layer 36 with a plurality of apertures 38 is screen printed over the display area to cover all of the connector crossover leads as well as to more precisely define the shape of each bit 32. Therefore, only that portion of the cathode electrode character bits 32 is exposed within the envelope for visible glow when a voltage is applied between the cathode and the respective anode.

Figure 3:
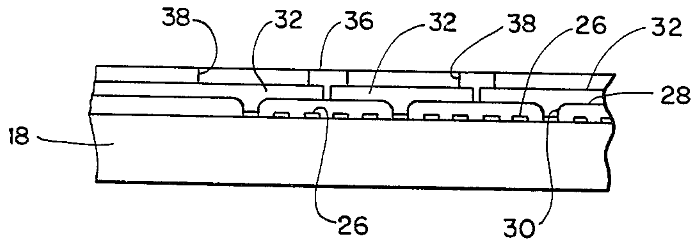
FIG. 3 is a sectional view taken along the lines 3—3 in FIG. 2.

Reference is made to FIG. 3 to show in sectional view the layering of the connector lines 26 and cathode bits 32 with the respective interposed dielectric layer 28 and mask layer 36 to form the cathode dot matrix arrangement on the substrate 18. Each of the cathode electrode bits 32 is shown connected through the respective vias 30 to a corresponding connector line 26. The mask layer 36 provides the definition of the portion of the electrode bits that is to be subjected to glow.

Figure 4:
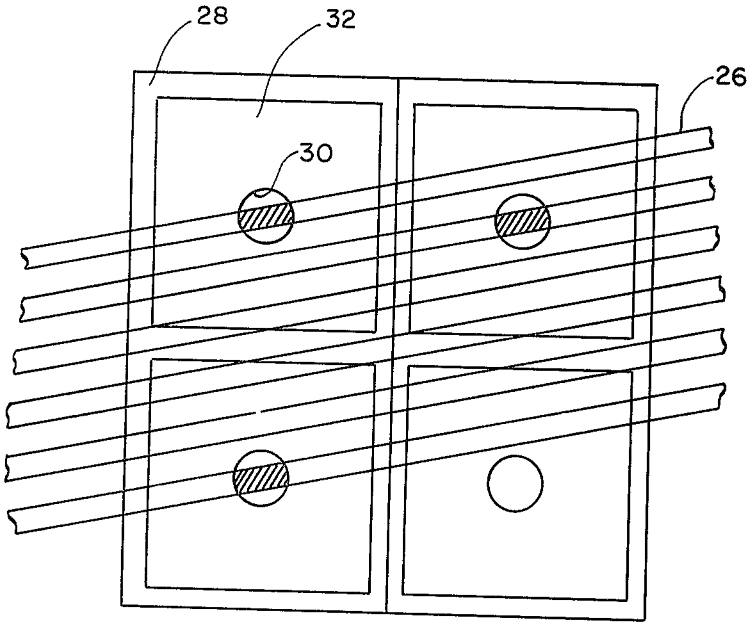
FIG. 4 is an enlarged detail view showing the interface between the connector lines and the dot matrix bits.

Attention is also directed to FIG. 4 showing in greater detail the interface between the connector lines 26 and the cathode electrode bits 32 through the vias 30 in the dielectric layer 28. The utilization of high technology photolithography provides the ability to form connector lines 26 having a width of 0.005 inches with 0.005 inches from the spacing between the connector lines. It is very critical that the spacing be done properly so that alignment is assured between the respective connector lines 26 and the vias 30 which preferably have a diameter of approximately 0.010 inches. In the present embodiment of the invention, cathode electrode dot or bit size would be 0.04 inches by 0.04 inches.

Although some of the detailed particulars of constructing a negative glow d.c. gas discharge display have not been set forth, it is assumed that those skilled in the art are familiar within the general construction of operable gas discharge display.

Figure 5:
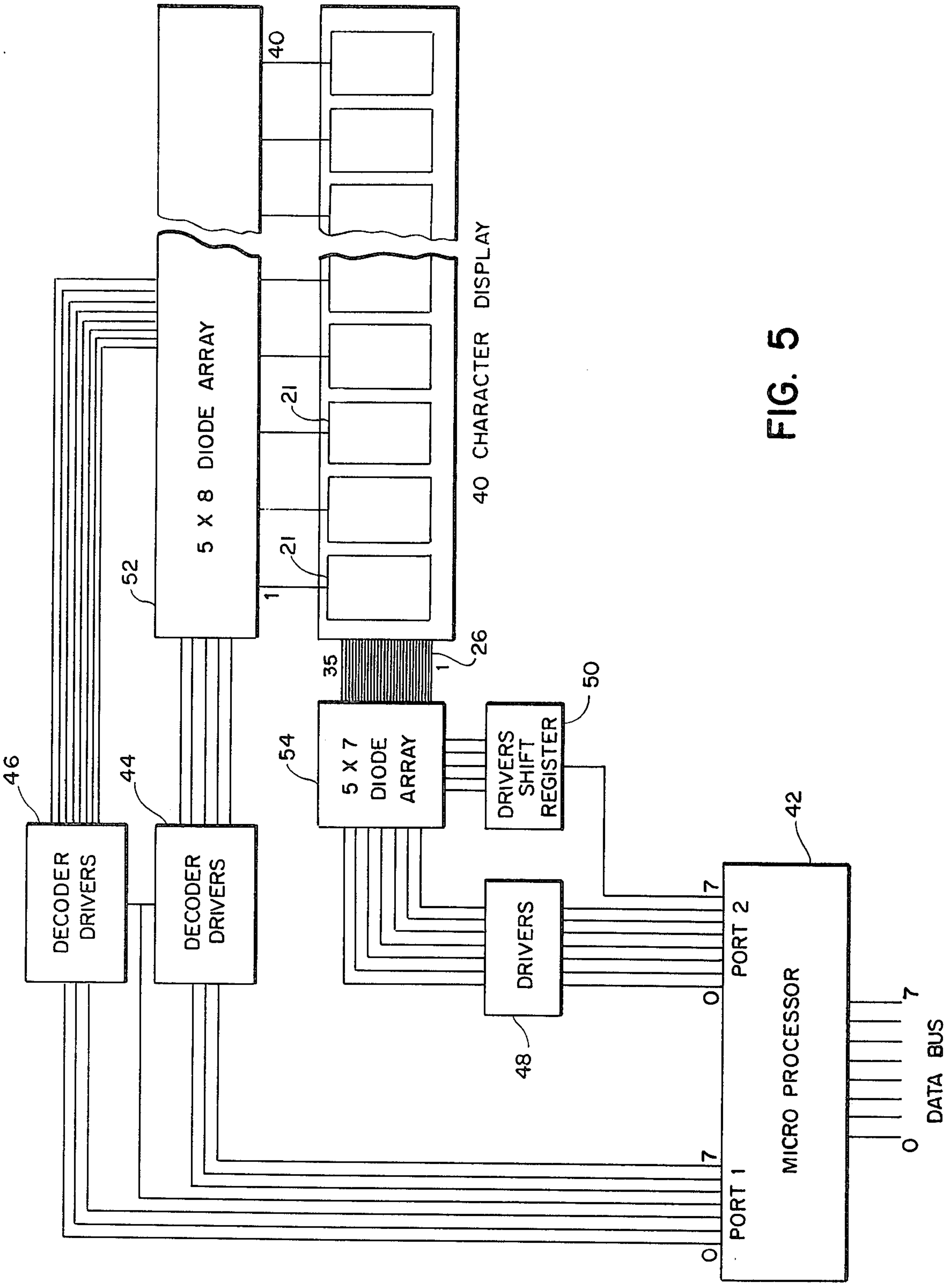
FIG. 5 is a circuit schematic for a 5×7 dot matrix having 40 dot matrix groups.

Turning to the operation of the present invention, FIG. 5 shows a circuit schematic for the embodiment of the present invention having 40 dot matrix groups 12 with each having a $5 \times 7$ dot matrix. In the present invention it is envisioned that a microprocessor 42 would be utilized to provide the necessary instruction input to the decoder drivers 44 and 46 which are connected to the anodes 21 as well as the decoder drivers 48 and 50 which are connected to the cathodes 32. In the case of the cathodes it is necessary to have 35 drivers since 35 connector lines 26 are utilized with each connected to one of the character bits 32 in each dot matrix group 12. With respect to the anodes 21, it is necessary to have 40 drivers to operate each of the separate anodes that are located over each $5 \times 7$ dot matrix group 12. The source of information to be displayed on the panel is fed through the data bus to the microprocessor 42 from which information is in the proper timing sequence submitted through port 1 and port 2 to control the respective anodes and cathodes. The cathode arrangement is controlled by a multiplexing operation, since the same respective cathode bit 32 in each $5 \times 7$ dot matrix is connected to the same connector line 26. By the proper multiplexing in conjunction with the time sequenced activation of the anode electrode 21, it is possible to directly address a particular character bit combination in each dot matrix group. Therefore, if a certain number of the cathode drivers are activating specific connector lines 26, when the respective anode electrode 21 over a particular dot matrix group 12 is activated, there would be a breakdown voltage between the anode and cathodes, resulting in a glow discharge to formulate based upon the combination of character bits activated a particular desired message.

It is possible through the use of some type of diode arrays 52 and 54 to reduce respectively the number of decoder drivers necessary to operate the series of anodes as well as the drivers necessary for the cathodes.

One significant problem with respect to a message readout panel is the requirement in many instances to have the capability to display as much information as possible within a particular dimensional area. In some instances it is necessary to provide a fully populated display. In other words, the entire display area is filled to its physical limits with a certain dot matrix arrangement. However, in such a fully populated display the close physical proximity between one dot matrix group and an anode of an adjacent dot matrix group is such that the character bits in the one dot matrix group may be activated by the adjacent anode causing crosstalk or streamers.

Figure 7:
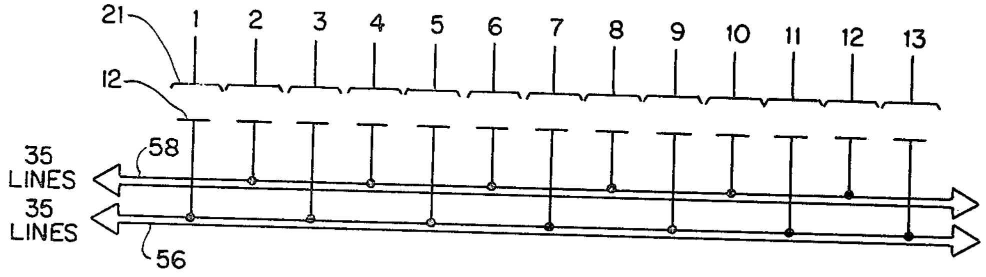
FIG. 7 is a circuit schematic showing the fully populated cathode interlacing detail.
Figure 8:
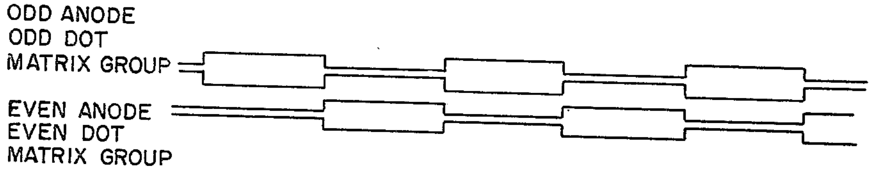
FIG. 8 is a timing diagram of the fully populated display.
Figure 6:
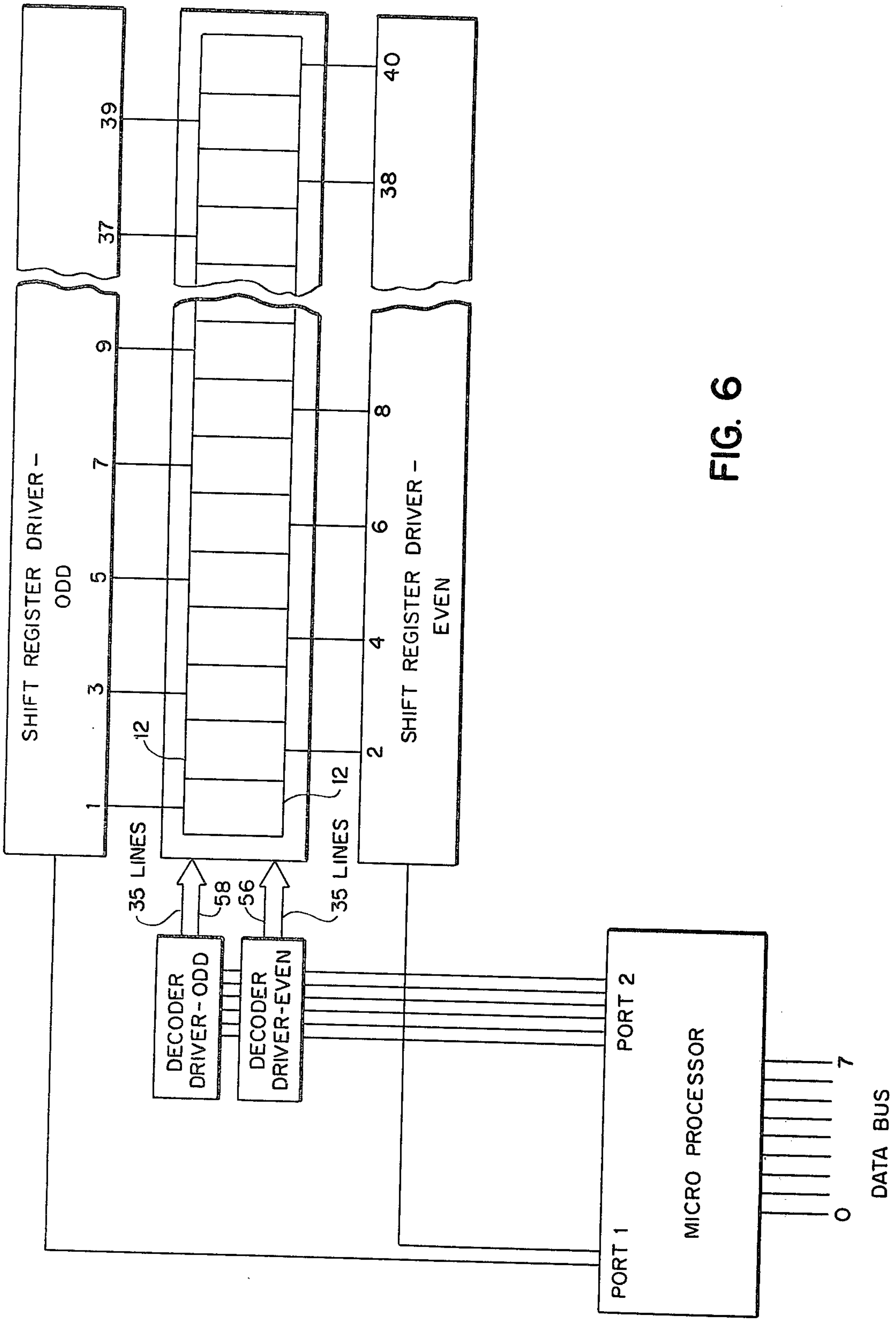
FIG. 6 is a circuit schematic for a fully populated display.

Reference is made to FIG. 6 showing a circuit schematic for a fully populated display in such a manner that the crosstalk problem is eliminated. The approach is the utilization of dual sets 56 and 58 of 35 connector lines 26 for a 5×7 dot matrix multicharacter arrangement. Therefore, every alternate or every other one of the dot matrix groups 12 is connected to a different series of or group of connector lines 26. By the proper time sequencing of the different series of connector lines being activated, the activation of the adjacent anode will not activate the cathodes in an adjacent dot matrix arrangement, because these cathode bits will not be activated at that time period. Attention is directed to FIG. 8 showing a timing diagram of the operation of the respective odd and even anodes and their corresponding odd and even cathode dot matrix groups. Reference is made in FIG. 7 as an additional schematic representation with respect to the two separate series 56 and 58 of 35 connector lines which are tied to each cathode bit of the dot matrix groups 12 in alternating sequence with respect to the anode electrodes 21.

What is claimed is:

1. A message readout dot matrix gas discharge display panel comprising:
- a substrate;
- a face plate sealed in spaced relation to said substrate to establish an envelope containing an ionizable gas;
- a first series of dot matrix groups located on said substrate and having a matrix of equally sized and uniformly arranged discrete cathode bits;
- a second series of dot matrix groups located on said substrate and having a matrix of equally sized and uniformly arranged discrete cathode bits of the same size as in said first series of dot matrix groups, each of said groups of said first and second series of dot matrix groups being arranged in alternating sequence with respect to each other so that no two dot matrix groups of one of said first and second series are next to each other on said substrate;
- a set of connector lines extending along said substrate, each of said connector lines interconnecting the same respective cathode bit of each of said first series of dot matrix groups;
- another set of connector lines extending along said substrate, each of said connector lines interconnecting the same respective cathode bit of each of said second series of dot matrix groups, so that the peripheral discrete cathode bits of one dot matrix group of said first series of dot matrix groups is positioned as close to the peripheral discrete cathode bits of an adjacent dot matrix group of said second series of dot matrix groups as said peripheral discrete cathode bit is as close to other discrete cathode bits within its own group so that more of said dot matrix groups can be positioned on said substrate without adjacent dot matrix discrete cathode bits of said first series of groups being inadvertently activated when an adjacent group of discrete cathode bits of said second series of groups is activated;
- a dielectric layer between said character bits and said connector lines, said dielectric layer having a matrix of apertures to permit interconnection between said connector lines and said respective cathode bits of each dot matrix group of said first and second series of dot matrix groups;
- an anode electrode positioned in operative relation with each of said dot matrix groups; and
- means for directly addressing each of said character bits to produce high luminance for enhancing viewability of said display.

2. A message readout dot matrix d.c. gas discharge display panel comprising:
- a substrate;
- a face plate sealed in spaced relation to said substrate to form an envelope containing an ionizable gas;
- a plurality of dot matrix groups on said substrate and having a viewable matrix of X by Y of screen printed cathode electrode bits;
- X times Y interconnect conductors extending along the length of said substrate;
- an anode electrode located in operative relation with each of said dot matrix groups; and
- means for directly driving each of said cathode bits in each dot matrix group.

3. A message readout dot matrix gas discharge display panel as defined in claims 1 or 2, wherein each of said cathode bits is a screened layer of conductive ink.

4. A message readout dot matrix gas discharge display panel as defined in claim 1 or 2, wherein said connector lines are approximately 0.005 inch in width.

5. A message readout dot matrix gas discharge display panel as defined in claim 1 or 2, wherein said matrix of each dot matrix group is a five by seven arrangement of said cathode bits.

6. A message readout dot matrix gas discharge display panel as defined in claims 1 or 2, wherein each of said anode electrodes is a transparent electrode layer on the inside face of said face plate.

* * * * *